May 20, 1941.  J. THYSSE  2,242,274
COMBUSTION CHAMBER FOR INTERNAL COMBUSTION ENGINES
Filed Sept. 1, 1937
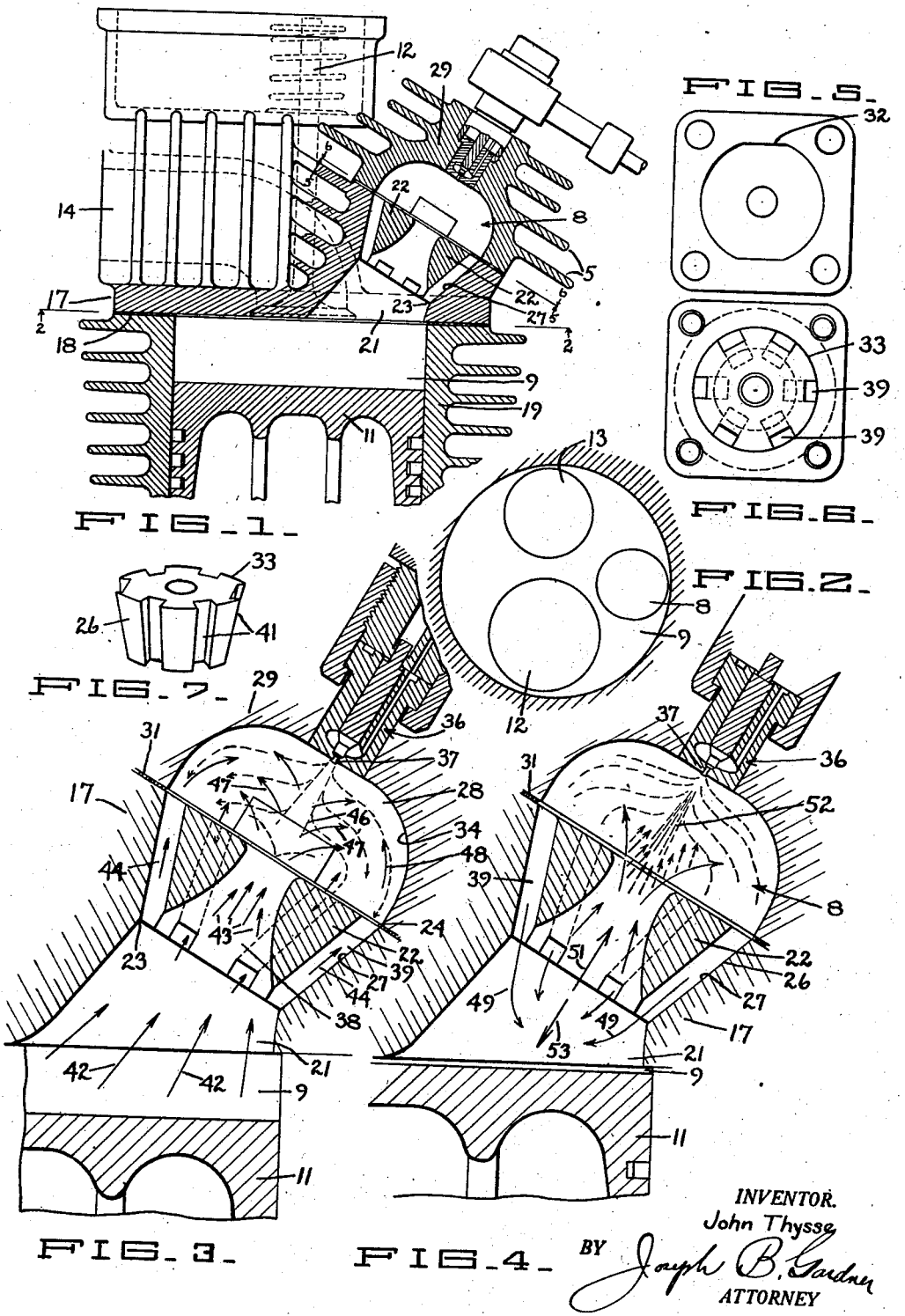
INVENTOR.
John Thysse
BY Joseph B. Gardner
ATTORNEY Patented May 20, 1941

2,242,274

UNITED STATES PATENT OFFICE 2,242,274

COMBUSTION CHAMBER FOR INTERNAL COMBUSTION ENGINES

John Thysse, Alameda, Calif.

Application September 1, 1937, Serial No. 161,993

5 Claims. (Cl. 123—33)

The invention relates to combustion chambers for internal combustion engines such as the pressure and turbulence types of air cells and the like, known also in the art as the "Lanova" and "Ricardo" forms of combustion chamber construction.

Heretofore certain difficulty has existed in starting Diesel engines, due principally to the fact that in starting, the engine is usually cold and the temperature and pressure in the air at the end of the compression stroke is correspondingly low. Also in starting a relatively large engine, the latter is turned over by a starter at a low speed so that the compression and temperature of the air in the combustion chamber is also for this reason substantially smaller than occurs during a warmed up running condition. As is also understood, the fuel, usually a relatively low grade hydrocarbon oil, is injected into the cylinder head or combustion chamber in a relatively solid stream and there is little opportunity for the fuel to mix with the compressed air in the chamber. Thus unless the air is of sufficient density and temperature no burning will occur. As a result, it has been common to employ glow plugs and other ignition devices for facilitating the starting operation. There has also been developed in recent years the so-called air cell type of combustion chamber wherein a part of the combustion chamber is set off from the main chamber proper and receives part of the air compressed in the chamber during the compression stroke of the engine. The principal use of the cell is to receive a part of the fuel injected into the cylinder and to cause a burning thereof and a relatively high speed discharge of the burning fuel and air and products into the combustion chamber to set up a turbulence for facilitating the breaking up and distribution of the relatively solid fuel stream being injected. The air cell, however, is of little benefit in starting the engine inasmuch as normally the cell is surrounded by the water jacket or other cooling surfaces of the engine so that the air in this cell at the end of the initial compression stroke is usually cooler than the air in the remainder of the combustion chamber, and ignition is therefore less likely to take place in the air cell than in the other portions of the chamber. Also the air cell usually is connected to the remainder of the combustion chamber by relatively small apertures or passages which are used to direct the discharge of fuel and air from the air cell, as above explained, and any of the injected fuel striking these passages is cooled due to the relatively large surfaces of contact.

In accordance with the present invention, and as a principal object thereof, I provide a combustion chamber which is capable during the initial compression stroke of the engine to cause a substantial breaking up of the relatively solid fuel injection stream and an intimate mixing of the fuel with the compressed air under such favorable conditions as to cause burning of the fuel, notwithstanding the reduced temperature and pressure of the air in the chamber, due to a cold starting condition. In effecting this starting of the engine, an air stream is established in opposition to the fuel stream so as to cause a substantial breaking up of the frontal part of the fuel stream and an intimate mixing with the oncoming air stream and from this inter-action the mixed air and fuel pass to a hot quiescent zone at the head of the cylinder where burning takes place. In the present engine the air stream aforesaid is created at a portion of the combustion chamber adjacent the engine cylinder and strikes the oncoming oil stream prior to engagement with any of the cylinder or chamber walls and as a result retains substantially all of the heat energy stored therein during compression. At the same time the inter-action of the air and oil streams not only splits off a substantial portion of the oil stream and intimately mixes the same with the air but also the neutralizing of the opposite kinetic energies of the streams transforms such kinetic energy into heat which is additive to the stored heat in the air to facilitate burning.

Another important object of the present invention is to provide a high speed fuel injection type engine which will have substantially improved running characteristics over engines heretofore used. As will be clear from the foregoing, even during the running operation of the engine when the latter has become heated to a point to maintain stable operation, the oil injection stream must be broken up and intimately mixed with the air in the combustion chamber before efficient burning can take place. In the earlier types of Diesel engines, where the fuel was injected in a relatively solid stream into a substantially quiet pressed body of air in the combustion chamber, a considerable time period was required to enable a proper mixing of the oil with the air and as a result, the engines had to be run at a relatively low speed in order to allow a proper burning of the fuel. Any attempt to raise this running speed was met by very poor and incomplete and inefficient burning conditions within the engine and large portions of burnable mixture and smoke and even solid particles of fuel were exhausted from the engine. Even at low speed operation these engines could not realize a most efficient burning of the fuel due to the lack of fuel distribution in the combustion chamber and the uneven localized, pyrotechnic burning of the fuel. The air cell type of engine was developed to overcome many of the disadvantages of the previously existing type of engine, but in turn had several disadvantages, even in the running operation of the engine. For one thing, as above explained, the air cell relies upon a delayed type of operation, that is, the air must be compressed into the cell and the fuel injected into the cell before any burning can take place in the cell for causing a reactive flow of gases into the combustion chamber to assist in the breaking up of the fuel injection stream and the mixing of the fuel with the air in the combustion chamber. Thus the cell does not come into operation until a substantial period after the initial injection of fuel into the combustion chamber. Also in air cell engines heretofore used, the discharge of products from the cell has been used to establish a turbulent swirling and mixing of the air and fuel in the combustion chamber and the relatively high velocity of the movement of the air and fuel mixture retards and prevents the burning of the mixture. Consequently, appreciable burning only takes place after the swirling turbulent air and fuel mixture has reached a relatively quiescent state. As a result, there are two retarding periods involved in the operation of this type of engine, one the time required for the air cell to go into operation and a second, the time required for the swirling turbulent mixture to slow down to a sufficiently quiet state for burning. This type of engine, although an improvement over the previous types of engines insofar as a higher speed of operation is concerned, nevertheless is limited in high speed operation by the two retarding periods mentioned. Also, as will be understood, a substantial portion of the available energy liberated from the air cell is dissipated in the setting up of a swirling turbulent action on the remainder of the fuel and the air in the combustion chamber and this portion of the energy is lost to the final energy output of the engine. In the present engine and as a principal feature of advantage thereof, the time required to effect a breaking up of the fuel stream and an intimate mixing of this fuel with the air in the combustion chamber and a burning of the fuel, is materially reduced from that required in previous types of engine with the result that substantially higher speeds and more efficient engine operation may be obtained. Also, the mixing of the air and fuel is effected without subtracting any appreciable portion of the available energy from the engine in contrast to the air cell operation above mentioned.

A further object of the invention is to provide a combustion chamber construction of the character described which, notwithstanding the setting up of certain air streams for breaking up and mixing of the fuel, will be effective to produce a proper mixture and burning environment directly over the head of the piston so that initial burning and expansion of the gases will be immediately and directly communicated to the piston for transfer into useful work.

Still another object of the invention is to provide a combustion chamber construction for internal combustion engine of the character described which, by reason of its design and construction, is especially suited for air cooling of the exposed radiating surfaces of the cylinder and combustion chamber and affords a highly efficient operating unit when used with air cooling, although the combustion chamber construction may with substantially equal facility be incorporated in a water cooling system for the engine.

The invention possesses other objects and features of advantage, some of which, with the foregoing, will be set forth in the following description of the preferred form of the invention which is illustrated in the drawing accompanying and forming part of the specification. It is to be understood, however, that variations in the showing may be adopted within the scope of the invention as set forth in the claims.

Referring to said drawing:

Figure 1 is a longitudinal sectional view of a combustion chamber constructed in accordance with the present invention and shown in conjunction with a part of an internal combustion engine.

Figure 2 is a reduced transverse sectional view of the combustion chamber and engine and is taken substantially on the plane of line 2—2 of Figure 1.

Figure 3 is a somewhat enlarged sectional view similar to Figure 1 and indicating one of the operating conditions of the chamber.

Figure 4 is a sectional view similar to Figure 3 and showing another operating condition of the chamber.

Figure 5 is a transverse sectional view of the chamber taken substantially on the plane of line 5—5 of Figure 1.

Figure 6 is a transverse sectional view of the chamber taken substantially on the plane of line 6—6 of Figure 1.

Figure 7 is a perspective view of a part of the combustion chamber.

The combustion chamber 8 of the present invention and as disclosed in the accompanying drawing is embodied in an internal combustion engine having a cylinder 9 and a reciprocating piston 11, inlet and exhaust valves 12 and 13 and intake and exhaust passages 14 and 16, the engine here being shown in abbreviated form in favor of the combustion chamber construction of the present invention. The combustion chamber in the present arrangement is formed in part by the head casing 17 of the engine, which also provides the intake and exhaust passages and carries the valves and associated operating mechanisms, and is mounted over the upper end 18 of the engine block 19 providing the cylinder 9. The lower end 21 of the combustion chamber is positioned directly over the upper end of the cylinder 9 and forms an air inlet chamber to an air directing and fuel mixing member 22 mounted thereabove in the combustion chamber. The lower end chamber 21 preferably converges somewhat towards the remainder of the chamber so as to concentrate and accelerate the flow of air into the combustion chamber from the cylinder during a compression stroke of the engine. The chamber 21 converges longitudinally to an intermediate point 23 where the walls of the chamber diverge to the outer end portion 24 of the head casing 17 so as to receive and retain in the divergent portion the air director and mixing member 22 which, in accordance with the present showing, is preferably formed as a frustro-conical insert having side walls 26 adapted to engage the divergent side walls 27 of the chamber between the portions 23 and 24 of the chamber. The outer part 28 of the combustion chamber is formed as a cavity in a casing 29 adapted for clamping of its inner face 31 against the outer surfaces 24 of the head casing and which may be formed with opposed overhanging side portions 32 for engaging the outer surface 33 of the insert 22 for holding the latter against longitudinal movement from the lower portion of the combustion chamber. In other respects, the inner wall 34 of the chamber formed by the casing 29 conforms generally to the shape of the lower portions of the chamber and is, with the exception of the portions 32, substantially circular at the lower face 31 and is of a generally inverted bowl shape formed above its face so as to close off the outer end of the chamber. It will, of course, be understood that the exact shape of this combustion chamber may vary with different engine designs and with different compression ratios. Carried in the outer extremity of the casing 29 is a fuel injection nozzle 36 which, as here shown, is of the so-called pintle type of more or less standard and well known design and is arranged in the casing 29 with the discharge aperture 37 and longitudinal axis of discharge substantially co-incident with the longitudinal axis of the combustion chamber. As is understood, the discharge of fuel such as oil from the pintle as well as other types of injection nozzles which may be here used, is in a relatively solid stream having a divergence in the direction of travel which may be controlled by the individual design of the discharge nozzle, the angle of divergence here shown being between approximately 10 to 15 degrees, although as will be understood, other divergent angles of the fuel injection stream may be used.

In accordance with the present invention I provide means in the combustion chamber for breaking up this relatively solid pencil injection of the fuel and to cause thereupon an intimate mixing of the fuel particles with the air in the combustion chamber and to pass such mixture into a favorable burning environment. The breaking up of the injection stream or pencil is arranged to be effective in the present device by an opposing stream or column of air which is set in motion by the piston during the compression stroke and guided into a preferred form and velocity by the member 22. As here shown, the member 22 is formed with a central Venturi passage 38 which reduces in cross-sectional area towards the outer portion of the chamber so as to confine and accelerate the air passing therethrough into a relatively solid fast moving column in direct axial opposition to the incoming stream or pencil of injected fuel. In the normal operation of the engine, that is, after a stable running condition has been reached, the action of the central column of air passing through the venturi 38, is to directly strike the expanded leading face of the fuel stream so as to break up and flatten out this portion of the fuel stream and to produce lateral, mixed streams of air and fuel flowing towards the sides of the combustion chamber. At the same time I provide a plurality of annular spaced longitudinally extending passages 39 which extend from the inlet chamber 21 of the combustion chamber along the sides of the chamber to the outer portion 28 and which direct a plurality of air streams along the sides of the chamber which are bent inwardly by the curved end portion 34 into direct contact with the laterally driven fuel and air streams so as to produce an intimate mixing of the substantially isolated fuel particles thus formed with these heated streams of fresh air. The passages 39 are here shown defined by longitudinal channels or grooves 41 formed in the outer surface 26 of the insert and thereby formed in part by the insert and in part by the wall 27 of the head casing.

The initial clashing of the air stream rising through the venturi with the fuel injection stream and the subsequent clashing of their resultant streams with the air streams rising through the passages 39, produces a turbulence in the outer chamber 28 which is productive of a thorough mixing of the fuel initially injected and air and due to such turbulence and also the relatively rich mixture little or no burning will take place in the outer chamber 28. This initial clashing of the various fuel and air streams and injection of the fuel takes place, as will be understood, as the piston 11 is moving towards an end position in the cylinder. Preferably the fuel injection pump is timed from 25 to 30 degrees ahead of a top dead center position of the crank shaft. In this and the subsequent positions of the piston, the latter moves towards the end of the cylinder, creating a general movement of air and pressure towards the outer end of the combustion chamber so as to produce the air streams aforementioned. However, during this part of the piston travel there is a deceleration of the piston which, together with the pressure produced in the outer end of the combustion chamber by the fuel injection, establishes a reactive movement of the fuel and air products from the outer to the inner end of the combustion chamber. This first reactive surge will take place shortly after the beginning of the fuel injection period and prior to the arrival of the piston at its end position and carries with it the rich air and fuel mixture produced in the outer end of the chamber. This rich mixture is thus fed back through the annular spaced passages 39 and into the lower end chamber 21 which at the instant, due to the reduced speed of the piston, is charged with air at a relatively high temperature and pressure and which is in a substantially quiescent state capable of immediately supporting burning of the streams issuing from the base of the passages 39. In this connection it will be noted that the combustion chamber acts similar to the common type Bunsen burner in that the fuel is first mixed with a certain quantity of primary air in the outer portion 28 of the combustion chamber to effect a hydroxylation of the fuel and this mixture of air and fuel which is in itself too rich to burn, is fed into an atmosphere of air capable of supporting combustion. The initial burning, therefore, takes place in the lower end chamber 21 of the combustion chamber directly over the end of the cylinder and the gases expanded thereby are in direct communication with the piston for converting their heat energy into useful work. The initial burning in the chamber 21 also creates a pressure in this chamber which, augmented by the pressure created by the further advancement of the piston, overcomes the previous higher pressure at the outer end of the combustion chamber which was relieved somewhat by the reactive flow of the gases as above explained prior to burning. This reversal of the pressure differential between the opposite ends of the chamber, establishes a reversal in gas flow back towards the outer end of the chamber and due to the burning and the very high pressure created thereby this second outward gaseous flow is considerably faster and more concentrated than the initial air flow caused by the piston movement. In the present structure, the Venturi passage is designed to produce an amount of kinetic energy in this second outward gaseous flow capable of opposing and dispersing the rearward and more solid portions of the fuel stream and effects a substantially complete breaking up and dispersement of such stream during the entire remaining injection period. As will also be understood, the combustion chamber at this time is at a relatively high temperature which also greatly facilitates the breaking up and dispersement and mixing of the injected fuel. Also as in the first instance, this second reactive gaseous flow outwardly through the combustion chamber is accompanied by a gaseous flow through the side passages 39 which, as above explained, are deflected inwardly to completely disperse and mix with the scattered fuel stream. The end of the injection period is timed to coincide with substantially the end position of the piston and a top dead center position of the crank shaft so that immediately following the final dispersement and mixing of the fuel stream in the outer end portion of the combustion chamber a reversal in pressure will take place by reason of the start of the return movement of the piston. A reversal in pressure is also created, as will be understood, due to setting up of a reaction to the sudden outward movement of the gases following initial burning condition so that at approximately the end position of the piston a return movement of the gases will take place from the outer to the inner end of the combustion chamber. In this return movement as in the first instance, there is little or no burning until after the relatively rich gases are directed into the hot quiescent air in the lower end portion 21 of the combustion chamber.

The two characteristic operations of the combustion chamber have been illustrated in Figures 3 and 4, showing in Figure 3 the movement of the piston 11 in the direction of its end position during a compression stroke and in Figure 4 the piston in substantially its end position. With reference to Figure 3, it will be noted that the air travel above the piston and indicated by the arrows 42 is into the lower end chamber 21 and thence into the center Venturi passage 38 indicated by arrows 43 and up through the side passages 39 as indicated by the arrows 44. The impact of the stream 43 with the incoming oil stream, indicated by diverging dashed lines 46, occurs directly over the upper end of the member 22 to cause a lateral deflection of air and fuel as indicated by the arrows 47 and which strike and mix with the inwardly deflected air streams, indicated by arrows 48, issuing from the upper ends of the passages 39. Figure 4 shows the return movement of the gaseous streams through the side passages 39, as indicated by arrows 49, and which upon burning causes a re-expansion of the air and products upwardly through the Venturi opening 38, as indicated by arrows 51, to attack and disperse the more solid rearward portion 52 of the fuel injection stream. This initial combustion also serves to act directly on the piston as indicated by arrow 52.

It will now be clear that in the operation of the present engine a substantially complete dispersion and mixing and burning of the injected fuel takes place and the entire process of dispersing and mixing and burning of the fuel is effected within approximately 25 to 30 degrees of crank shaft rotation preceding a top dead center position. Thus the present system entails no substantial lag in its operation and as a result, extremely high engine speeds may be obtained.

This will be further clear in view of the fact that substantially the entire operation of the deflecting and mixing functions of the apparatus are enervated by the air velocity and flow set up by the piston and consequently the faster the piston moves the faster the fuel dispersion and mixing will take place. It will also be noted that the initial combustion is directly over the piston in a position to produce useful work and is not contained in an isolated air cell as heretofore and at the same time such initial combustion provides all of the advantages of such an air cell in stimulating the upward flow of gases through the Venturi passage.

It may be further noted that the forming of the member 22 as an insert operates to insulate this member slightly from the walls of the combustion chamber so that the member will remain hotter than the walls of the chamber. This retained heat is in turn passed to the air rising through the Venturi passage 38 to increase the temperature and velocity of the air.

In addition to the improved running characteristics of an internal combustion engine afforded by the present combustion chamber, the latter also is effective to produce improved starting of the engine in causing a burning of the fuel at a lower compression ratio than has been heretofore possible. This is due primarily to the efficient method of breaking up the entering fuel stream and the dispersing and mixing of the fuel with the air and the subsequent passing of this mixture to a substantially quiescent heated mass of air so as to produce a burning of the mixture at lower temperatures and pressures than are possible with other types of combustion chambers. Also it will be noted that the air passing through the Venturi 38 is brought into contact with the incoming oil stream without having lost any appreciable amount of heat to wall surfaces of the combustion chamber with the result that the air column will have a maximum temperature and velocity of flow, possible in a cold starting condition, for acting upon the oil stream. The energy in the air column passing through the venturi 38 in a cold starting condition will not ordinarily be sufficient to completely offset the energy of the incoming fuel stream due to low speed and temperature of the engine and to a relatively full throttle setting which is used to facilitate starting. Thus while the air column is effective to produce a substantial breaking up and dispersion of the incoming oil stream, the latter will penetrate through the central opening of the Venturi passage and through the rising air column directly into the relatively quiescent mass of air over the top of the piston. The combination of the finely divided fuel particles and the heated quiescent mass of air is capable of starting the engine under nearly any adverse condition of temperature and starting speed.

Another feature of the present combustion chamber is its ready adaptability to an air cooling system in that the walls of the combustion chamber extend generally away from the end of the cylinder block so that the same are readily accessible and sufficiently spaced from other parts of the engine for incorporation of heat radiating fins 54. While air cooling may be readily applied to the present combustion chamber, it will be of course understood that the same may be cooled by a water jacket or the like placed around the chamber.

From the foregoing it will be understood that the present combustion chamber may be used with substantially all the types of internal combustion engines using a Diesel or Otto or other cycle, such as the Seliger cycle or the like, and may be used in conjunction with various fuels ranging from the heavier petroleum fractions such as common Diesel oil, to higher test gasolines and the like, as well as other fuels arranged for so-called solid injection.

I claim:

1. In an internal combustion engine having a cylinder and a piston reciprocally mounted therein, a cylinder head providing an elongated combustion chamber communicating at one end with an end of said cylinder, a fuel injection nozzle mounted in said head at an opposite end of said chamber and adapted to direct a stream of oil substantially axially into said chamber in the direction of said first chamber end, said chamber being formed adjacent its first named end but spaced therefrom with an annular side wall diverging in the direction of said opposite end and extending to an intermediate portion of said chamber, a frustro-conical shaped member having side walls substantially coterminous with and tapered in conformity with said divergent chamber wall and seated thereon and dividing said chamber to define inner and outer portions each of substantial volume and formed with a central passage therethrough and formed with a plurality of annular spaced longitudinally extending channels in the side wall thereof which coact with said chamber side wall to define a plurality of air passages, the portion of said chamber adjacent said second named end being curved to deflect streams of air passing through said last named passages in the direction of said end portion inwardly towards the central axis of the chamber.

2. A combustion chamber construction for a Diesel type engine comprising in combination with a cylinder and a reciprocative piston therein, means providing a generally elongated chamber opening at one end to said cylinder and providing substantially the entire compressed air space in the top dead center position of said piston, fuel stream injection means adapted to direct a stream of oil into said chamber from the outer end thereof remote from said cylinder in an axial direction through said chamber and providing a stream having a relatively small angle of divergence, the chamber walls being tapered from said first mentioned end to a longitudinal part of the chamber spaced from said end, said chamber walls being divergent outwardly from said part to a second longitudinally spaced part of said chamber, the outer end of said chamber being of an inverted spherical dome shape and extending to said last named part, a conical member inserted into said chamber and supported on the divergent walls thereof between said first and second named parts, said member having a central passage tapering outward and formed with the passage wall thereof extending substantially to said first chamber wall part, said member providing a plurality of longitudinal passages adjacent to and parallel to and substantially coterminous with said divergent chamber walls between said parts whereby gaseous streams passing outwardly through said passages will be guided by said end wall into a lateral direction against the injected oil stream.

3. A combustion chamber construction for a Diesel type engine comprising in combination with a cylinder and a reciprocative piston therein, means providing a generally elongated chamber opening at one end to said cylinder and providing substantially the entire compressed air space in the top dead center position of said piston, fuel stream injection means adapted to direct a stream of oil into said chamber from the outer end thereof remote from said cylinder in an axial direction through said chamber and providing a stream having a relatively small angle of divergence, the chamber walls being tapered from said first mentioned end to a longitudinal part of the chamber spaced from said end, said chamber walls being divergent outwardly from said part to a second longitudinally spaced part of said chamber, the outer end of said chamber being of an inverted spherical dome shape and extending to said last named part, and an inverted frustro-conical member mounted on said divergent walls between said first and second named parts and being substantially coterminous in length with said walls, said member having a central passage therethrough of a diameter at the reduced inner end of said member substantially equal to the diameter of the member whereby the walls of the passage extend to and substantially intersect said first chamber wall part, said member passage being tapered to the outer end of said member so as to concentrate a gaseous stream passing outwardly therethrough, said member being provided with a plurality of circumferentially spaced longitudinally extending channels on the periphery thereof defining with said divergent walls a plurality of passages substantially coterminous in length with said divergent walls whereby gaseous streams passing outwardly through said passages will be guided to the dome shaped outer end of the chamber for deflection radially against the injected oil stream.

4. A combustion chamber construction for a Diesel type engine including an engine cylinder and a piston reciprocally mounted therein comprising, means providing a generally elongated chamber opening to the head end of said cylinder and providing substantially the entire compressed air space in the top dead center position of said piston, fuel injection means adapted to direct a stream of oil into said chamber from the outer end thereof remote from said cylinder in an axial direction through said chamber and providing a stream having a relatively small angle of divergence, the walls of said chamber at a portion intermediate the length thereof being divergently tapered in the direction of said outer chamber end for an intermediate portion only of the length of said chamber, and a frustro-conical member having the sides thereof tapered in conformity to the taper of said wall portion and fitted into said chamber in engagement with said wall portion to separate said chamber into inner and outer portions each of substantial volume, said member having a central passage therethrough in axial alignment with the axis of said chamber and said fuel injection means, said member being formed with a plurality of longitudinally extending channels in the outer periphery thereof cooperating with the tapered wall portion of said chamber to define tapered longitudinal passages at the side wall of said chamber communicating the portions of said chamber at the opposite longitudinal sides of said member, said last named passages having a smaller cross sectional passage than said center opening.

5. A combustion chamber construction for a Diesel type engine including an engine cylinder and a piston reciprocally mounted therein comprising, means providing a generally elongated chamber opening at one end to the head end of said cylinder and formed with an inverted substantially spherical dome shaped outer end and providing substantially the entire compressed air space in the top dead center position of said piston, fuel injection means adapted to direct a stream of oil into said chamber substantially axially from said outer end and providing a stream having a relatively small angle of divergence, the walls of said chamber at a portion intermediate the length thereof being divergently tapered in the direction of said outer chamber end, a frustro-conical member having the sides thereof tapered in conformity to the taper of said wall portion and fitted into said wall portion to separate said chamber into inner and outer portions each of substantial volume, said member having a central passage therethrough in substantially axial alignment with the axis of said chamber and said fuel injection means, and passage means providing a plurality of circumferentially spaced passages surrounding said center opening in said member and substantially paralleling and adjacent to the tapered sides of said member and chamber wall portion so as to communicate the inner and outer chamber portions, said last named passages opening into said outer chamber portion substantially tangentially to the dome shaped outer end whereby gases passing outwardly through said passages will be curved inwardly towards the axis of said chamber, said last named passages each having a smaller cross-sectional area than said center opening.

JOHN THYSSE.